S. RITTY.
Horse Hay-Rake.
No. 223,247. Patented Jan. 6, 1880.
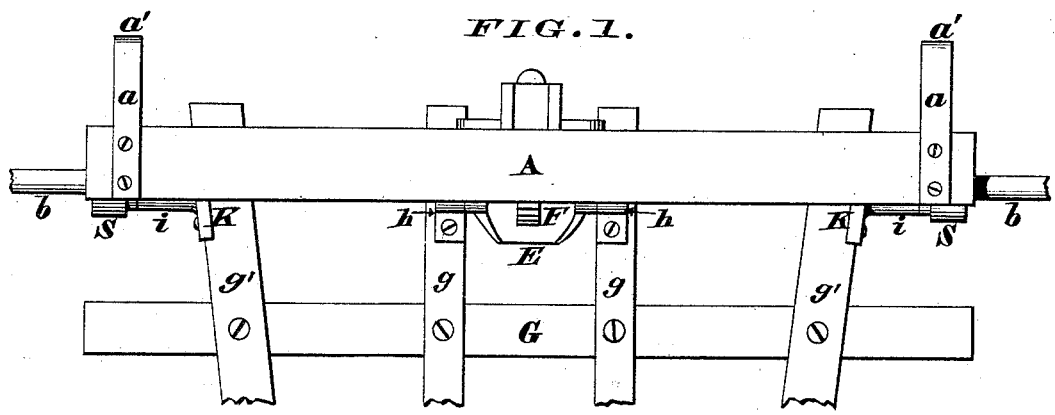
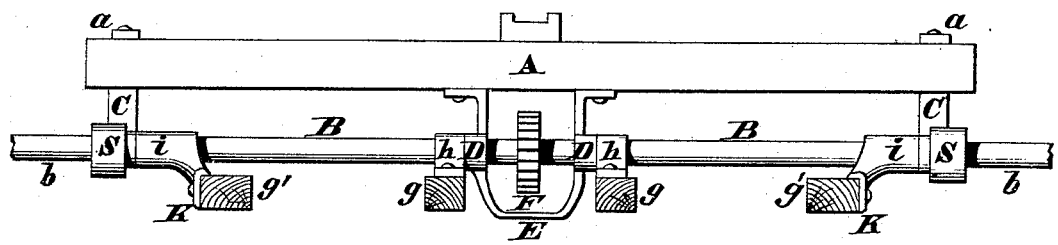
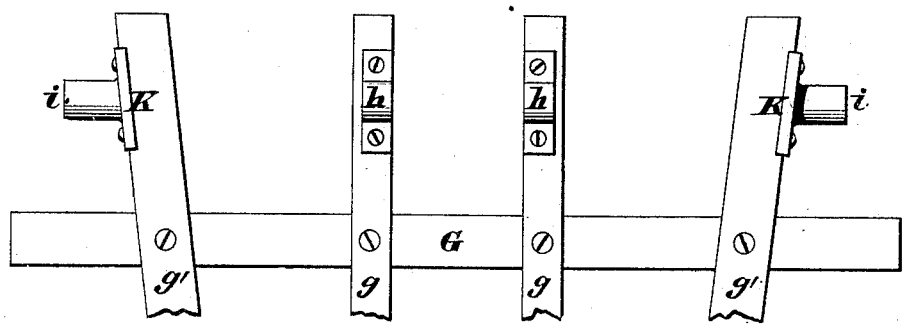
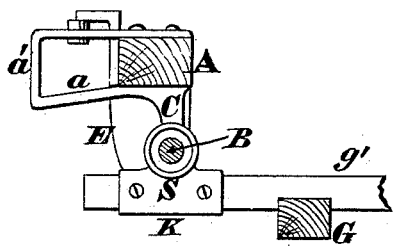 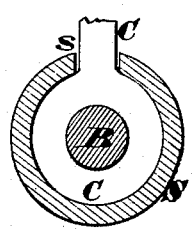 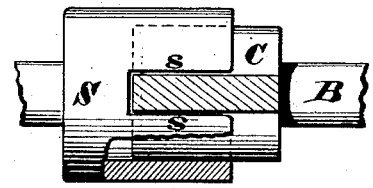
Attest
William L. Wright
Jeremiah F. Ludwig
Inventor.
Sebastian Ritty.
By John E. Keller
his atty.

UNITED STATES PATENT OFFICE.

SEBASTIAN RITTY, OF DAYTON, OHIO, ASSIGNOR TO JOHN DODDS, OF SAME PLACE.

HORSE HAY-RAKE.

SPECIFICATION forming part of Letters Patent No. 223,247, dated January 6, 1880.

Application filed April 22, 1879.

*To all whom it may concern:*

Be it known that I, SEBASTIAN RITTY, of Dayton, in the county of Montgomery and State of Ohio, have invented certain Improvements in Horse Hay-Rakes, of which the following is a specification.

My invention relates to that class of rakes in which the wheels are attached to a transverse metal axle which is arranged to revolve continuously and is provided with a lifting-wheel, through the medium of which the rake-head is turned to lift the teeth; and the invention consists in a peculiar construction and arrangement of parts by which the axle is caused to brace and stiffen the frame and thills, so as to avoid the usual expensive system of framing and bracing, and in a peculiar construction and arrangement of guards to protect the ground-wheels and axles from hay winding thereon.

In the drawings I have shown, for purposes of convenience and perspicuity, only those parts that my improvements are connected with—that is, the revolving axle and rake-head and the shafts, and also the parts that compose my improvements.

Figure 1 is a plan view of the parts above referred to in the position in which they are shown when the rake is fully set up and in operation. Fig. 2 is a front view of the revolving axle and its connections. Fig. 3 is a top view of the bearings of the revolving axle, that serve to brace the rake-frame. Fig. 4 is a sectional view of the rake-head, revolving axle, and frame; and Fig. 5 is a sectional view of the guards or thimbles that protect the hubs of the wheel, and Fig. 6 is a plan view of the same adjusted.

Referring to the parts by letter, A is the rake-head, having at either end the usual braces $a$, to the rear of which, $a'$, the tooth-board is bolted, that supports and lifts the rake-teeth, which have their attachment, in the usual manner, in the rake-head A.

B is the continuously-revolving axle, to which the driving-wheels are attached by ratchet-and-pawl connection, as usual, so that by their forward movement they revolve the axle. The axle is made, as usual, of heavy round iron, and possesses great stiffness and rigidity. By this axle the rake-head A is supported by means of the supports C at either end, and also by means of the supports or bearings D D, shown in the hood E, in which revolves the lifting-wheel F, secured to the revolving axle B.

The hood E is of peculiar construction, serving not only as a receptacle in which the revolving wheel can turn and be protected from the hay, but also as a support to the rake-head and a bearing to the revolving axle. Of course its size can be increased or diminished, according to the size of the lifting-wheel. It has an aperture at the rear, through which the dog or catch may operate against the lifting-wheel when it is desired to dump the rake.

Various devices have been employed from time to time to strengthen and brace the rake-frame. I think the method that I have shown in this rake simple and more efficient than anything that has before been in use. It can be constructed cheaper and operates more satisfactorily.

To the cross-piece G, I secure the single-tree pieces $g\ g$, having at their inner end inner bearings, $h\ h$, one on either side of the hood E, and on the outside I attach securely to the cross-bar G the shafts of the rake, $g'\ g'$, at the proper angle, and to the inner ends of these I attach the bearings and braces $i\ i$, circularly recessed to receive the revolving axle, and having their base extended sufficiently long to be securely and rigidly attached to the shafts $g'\ g'$, as shown at K.

It will be seen that the braces $i$ are made with long sleeves or necks encircling the axle, and with broad flanged connections with the thills, so that the shaft holds the braces from twisting laterally, and the latter, in turn, hold the thills. This bracing formed by the bearings $i\ i$, with their bases rigidly secured to the shafts $g'$, when taken in connection with the other parts of the frame—to wit, the cross-piece G and single-tree pieces $g\ g$—makes a strong and permanent bracing of the rake-frame and a very simple method of construction for it, and at the same time it furnishes the proper braces to the continuously-revolving axle B.

As there is danger of hay working in between the bands between the hub and axle and supports C C, I have shown a thimble or slide, S, circularly recessed, so as to slide over the axle, and having a recess, s, in one side of sufficient size to fit over the support C of the rake-head and cover the joint thus made between the revolving wheel and axle, and support the parts that I have shown in the drawings and described in the specification as my invention, and which I know as very simple; and I find from practical application that they are of great advantage in a revolving-axle rake, and they have been the result reached after careful experimenting with many devices as the simplest forms in which they could be made efficient.

I claim as my invention and desire to secure by Letters Patent—

1. In a hay-rake, the combination, with the metal axle, such as described and shown, the thills, and the metallic braces having elongated sleeves mounted upon and around the axle, of the extended bases secured rigidly to the thills, as shown.

2. In combination with the metal braces having the elongated necks and extended bases, the thills, the axle, and the cross-bar G, connected substantially as shown, the whole constituting a framing for a hay-rake.

3. In a hay-rake, the combination, with the metal braces $i$, of the metal axle, the thills $g'$ and bars $g$, and the hood E, with bearings D, applied as shown, to prevent the axle from springing under the strain of the thills and braces, and to cause the axle to sustain the thills.

4. In a hay-rake, the combination of the rotating axle, the head-supporting standards C, journaled upon the axle, and the tubular guards S, provided with slot $s$, and fitted over and around the standard, as shown.

5. As a new article of manufacture, the brace for a horse-rake, consisting of the elongated sleeve $i$, provided with the extended flanged base, as shown.

SEBASTIAN RITTY.

Witnesses:
 OREN BRITT BROWN,
 JOHN HANITCH.